Sept. 7, 1965  H. H. MEINKE  3,205,462

LOW-LOSS WAVEGUIDE FOR PROPAGATION OF $H_{10}$ WAVE

Filed Feb. 20, 1963

INVENTOR.
HANS H. MEINKE
BY
ATTORNEY

United States Patent Office 3,205,462
Patented Sept. 7, 1965

3,205,462
LOW-LOSS WAVEGUIDE FOR PROPAGATION
OF $H_{10}$ WAVE
Hans Heinrich Meinke, Bavaria, Germany, assignor to
General Electric Company, a corporation of New
York
Filed Feb. 20, 1963, Ser. No. 259,931
Claims priority, application Germany, Feb. 23, 1962,
T 21,642
19 Claims. (Cl. 333—95)

This invention relates to a waveguide with rectangular cross-section for the low-loss propagation of the $H_{10}$ wave, a waveguide which is especially suitable for very high power.

It is known that waveguides with rectangular or circular cross-section may be used for the propagation of electromagnetic waves, however, the losses of these waveguides are so substantial, that propagation of very high power over long distances is too inefficient. Additionally, there is an considerable rise in temperature of the waveguide. It is known that the attenuation during propagation of the $H_{01}$ waveguide with circular cross-section relative to that of the rectangular waveguide, is comparatively lower. If, however, extremely high powers must be propagated, for example, 10 mw. or more, then the use of the $H_{01}$ wave is not suitable, for such wave has a field distribution that is transformable to a free-space wave only with a very complicated, low voltage capable, narrow band device. If, however, the $H_{10}$ wave is used for the propagation of the necessary energy, substantial advantages are realized. This is because the field pattern of the $H_{10}$ wave is very similar to the field pattern of the free-space wave, so that the transition of the waveguide to free-space can be provided by a simple structure, for example, with a horn-type antenna. This transition has a very low reflection characteristic and is useable over a broad band of frequencies. Additionally, the transition from the power generating high power tube to the waveguide for those types of tubes known today, is simpler, higher voltage capable, and broader banded for the $H_{10}$ wave than the $H_{01}$ wave, because the field of the electron tubes are more similar to the $H_{10}$ wave than the $H_{01}$ wave.

It is known that the losses of a rectangular waveguide, operated with an $H_{10}$ wave, are reduced if the waveguide height and/or width are increased. However, in a waveguide whose cross-section for a given frequency, is substantially greater than the normal cross-section, several types of waves may exist, so that at all inhomogeneities changes in wave types can occur. In a waveguide with enlarged cross-section, the attenuation due to ohmic loss decreases; however, there are increased losses due to the changes of wave types which are possible in such a waveguide. Furthermore, it is very difficult to couple a generator to such a waveguide so that only the desired $H_{10}$ wave is produced—additional means being necessary to prevent the formation of the unwanted wave types and to make the already formed unwanted wave types ineffective.

The object of the instant invention is to provide a waveguide of substantially rectangular cross-section for the low-loss propagation of the $H_{10}$ wave, a waveguide which is especially suitable for very high power, and one which eliminates the above-mentioned disadvantages. According to this invention, it is proper that this waveguide be equipped on at least one waveguide broad wall with central longitudinal slots and on at least one waveguide narrow wall with transverse slots, and that also at least one of the two broad walls be arched outwardly.

It is already known to provide a circular waveguide, at those places which are free of circular currents, with longitudinal slots, whereby at such places a completely insulated break in the waveguide is made. These slots serve to eliminate the unwanted rotation of the plane of polarization of the propagating wave in the circular waveguide.

Moreover, there is already known one waveguide, in which, in deviation from an exactly rectangular cross-section, the waveguide broad walls and/or the waveguide narrow walls are arched inwardly or outwardly. These crosse-sectional types are selected to avoid an unwanted bending of the waveguide wall, for in some instances waveguides must be laid outside so that a deformation of their cross-section through earth fills or snow loads is possible.

The flexibility of a waveguide of circular cross-section is the same in all directions, whereas in waveguides with rectangular cross-section the broad walls of the tube suffer especially strong deformations through bending, so that bending of the walls into the inside of the waveguide can occur. For elimination of these disadvantages is already known that the waveguide cross-section may be formed with the broad walls of the waveguide arched outwardly.

This invention and its substantial advantages will be better understood from the following detailed description of the preferred embodiments in connection with the figures, wherein.

Figure 1:
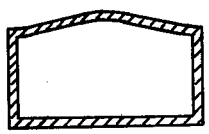
FIGURE 1 is a cross-sectional view of one form of the waveguide constructed in accordance with the invention, wherein one broad wall is arched outwardly.
Figure 2:
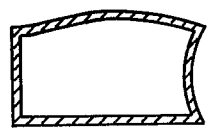
FIGURE 2 is a cross-sectional view of another embodiment of the invention, wherein in addition to the outwardly arched broad wall of the waveguide, one narrow wall is arched inwardly, the remaining walls being straight.
Figure 3:
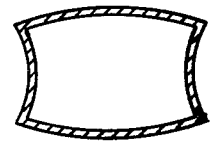
FIGURE 3 is a cross-sectional view of an additional embodiment of the invention, wherein both broad walls of the waveguide are arched outwardly and both narrow walls are arched inwardly, and wherein the right angles at the corners of the rectangular waveguide are preserved; and, FIGURE 4 is a perspective view of a further embodiment of the instant invention.
Figure 4:
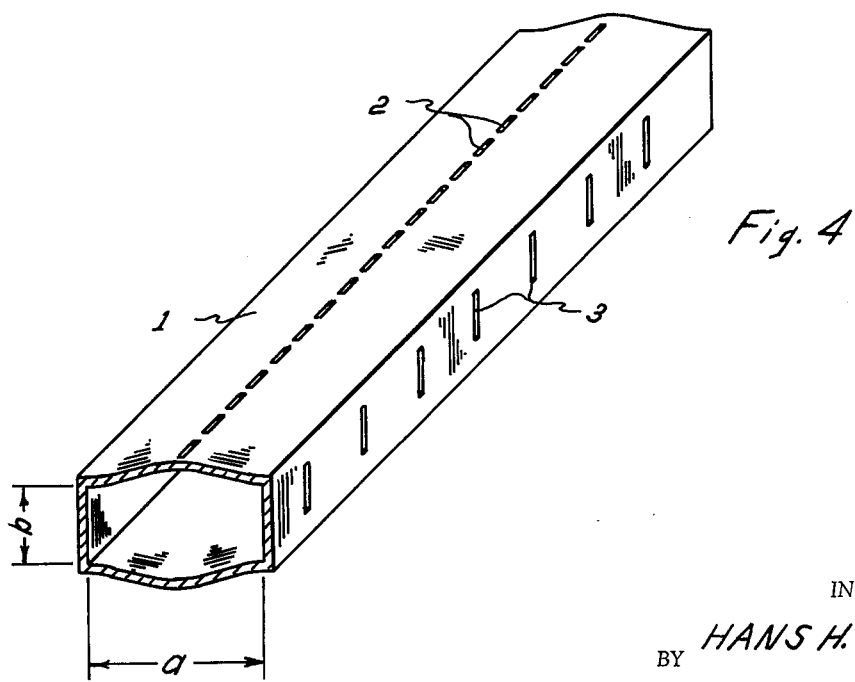

The embodiment of FIG. 4 comprises a waveguide 1 which has a rectangular-like cross-section. Both broad walls of waveguide 1 are arched outwardly, while the narrow walls, in a known manner, are formed by plane surfaces. Waveguide 1 has slots 2, which run in the longitudinal direction in the middle of one broad wall. Transverse slots 3 are disposed in a narrow wall of waveguide 1 and are oriented perpendicularly to the edges of the waveguide. The slots have two effects. First, they inhibit the generation of wall currents transverse to the slots and thereby the formation of wave types which have such currents. If these unwanted wave types are already existing in the waveguide, these wall currents must either travel a longer path around the slots or continue as displacement currents transversely through the slots. In each such instance transverse voltages are formed in the slots and electric and magnetic fields come out of the slots into the space around the waveguide. Thus, it is possible to substantially couple out the unwanted wave types with the help of these emerging fields from the waveguide, which can be done in several ways. In a waveguide provided with slots according to the invention and situated in free space, these slots function as antennas and radiate the energy of the unwanted wave types, which is equivalent to a strong attenuation of these wave types. Moreover, it is possible to couple these slots to secondary waveguides which strongly attenuate the frequencies emitted from the slots, so that the unwanted wave types are destroyed in these waveguides. This is possible through suitable dimensioning of the secondary waveguides and through placement of attenuating materials in the secondary waveguides. These secondary waveguides are preferably arranged with axes parallel to the principal waveguide. The series of slots on the broad wall "a" of waveguide 1 are preferably disposed so that the centrally arranged slots are short and closely spaced from each other. The exact location of the slots is not very critical and yet good attenuation of the unwanted wave types is obtained.

The lengths of the edges of waveguide 1 (a, width; b, height) are suitably selected so that on one hand the ohmic losses are as small as possible, which is equivalent to a cross-section as large as possible, and on the other hand as few unwanted wave types as possible can exist, because the difficulty of eliminating these unwanted wave types increases with their number.

Extensive experiments have shown that the suppression of some of the unwanted wave types is insufficient in an exactly rectangular waveguide provided with slots. The reason for this is as follows: because of the equality of the cutoff frequencies and of the phase velocities of the $E_{11}$ wave and the $H_{11}$ waves there exists in a rectangular waveguide a so-called "Langsschnittwelle" (longitudinal electric-magnetic mode), see Buchholz, ENT, volume 16, 1939, pages 73–85. This longitudinal electric-magnetic wave is the sum of an $E_{11}$ wave and an $H_{11}$ wave and has no longitudinal currents in the narrow walls "b" of the waveguide. It will not be disturbed, therefore, by the slots located as described herein. This combination of both waves can be found more often in slotted waveguides because both $E_{11}$ waves as well $H_{11}$ waves are partly transformed into the longitudinal electric-magnetic waves by the slots. In order to exclude these longitudinal electric-magnetic waves, the quality of their cutoff frequencies must be avoided. This is brought about, according to the instant invention, by arching outwardly at least one of the broad walls of the cross-section, as is shown in the figures. The waveguide broad walls are ached outwardly in such a way that the right angels between broad and narrow walls of the waveguide are preserved so that the rectangular waveguide characteristics are preserved. Thus this change in structure from an exact rectangular waveguide does not significantly change the propagation characteristics for the desired $H_{10}$ wave. After the $E_{11}$ and $H_{11}$ waves are provided with different cutoff frequencies and different phase velocities, the slots 3 in the narrow walls are fully effective.

The most important characteristics of a waveguide, built according to the present invention, are lower losses and a greater size. Because of the lower losses of the waveguide, there are provided in many respects improved applications:

(a) Bridging of longer distances with sufficient output voltage.

(b) Propagation of greater powers with the same temperature rise.

(c) Utilization for millimeter waves, for which the attenuation of the standard waveguide is already too great.

Because of the greater size of the waveguide built in accordance with the present invention, there result the following advantages:

(a) Larger cooling surfaces and thereby lower waveguide temperature with very high powers.

(b) Greater cross-section for millimeter waves, which permits easier handling, in general, of these waves.

The invention, which was illustrated with several examples, is by no means restricted to the described forms of cross-section. The illustrated forms can be varied whereby the slots, shown in FIG. 4, can be located in the same manner on both waveguide broad walls or on both waveguide narrow walls.

While the principles of the invention have now been made clear in an illustrative embodiment, there will be immediately obvious to those skilled in the art many modifications in structure, arrangement, proportions, the elements, materials, and components used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A device for the low-loss propagation of $H_{10}$ waves of very high powers comprising:

a principal waveguide with rectangular-like cross-section; wherein a plurality of longitudinal slots is centrally disposed in at least one of the broad walls of said waveguide, a plurality of transverse slots is disposed in at least one of the narrow walls of said waveguide, and at least one of said broad walls is ached outwardly.

2. The device of claim 1 wherein said longitudinal slots are relatively short and are relatively closely spaced apart along the length of said waveguide.

3. The device of claim 1 wherein at least one of said narrow walls is arched inwardly.

4. A device for the low-loss propagation of an electromagnetic wave of a predetermined type, comprising: a waveguide formed of opposed broad and narrow walls, adjacent edges of said broad and narrow walls being joined at substantially right angles whereby the rectangular characteristics of said waveguide are preserved, the cross-section area of said waveguide being greater than normal for propagation of said predetermined type of wave whereby losses are reduced, at least one of said broad walls being arched outwardly whereby the cutoff frequencies of at least two types of waves other than said wave of predetermined type are separated; a series of longitudinal slots disposed in at least one of said broad walls; and a series of transverse slots disposed in at least one of said narrow walls, said longitudinal and transverse slots being operable to inhibit the formation and propagation of wave types having wall currents transverse to said slots.

5. A device for low-loss propagation of an electromagnetic wave of predetermined type, comprising: a waveguide of rectangular-like cross-section formed of opposed broad and narrow walls, the width of said waveguide being at least three halves the wavelength of said electromagnetic wave, said cross-section of said waveguide having a shape such that the cutoff frequencies of at least two types of waves other than said wave of predetermined type are different as compared to being substantially the same in a waveguide of substantially exact rectangular cross-section; and means operable to remove wave types, other than said predetermined type, having predetermined characteristics from said waveguide.

6. A device as defined by claim 5 wherein at least one of said broad walls is arched outwardly to provide said shape of said cross-section of said waveguide.

7. A device as defined by claim 5 wherein at least one of said broad walls is arched outwardly and at least one of said narrow walls is arched inwardly to provide said shape of said cross-section of said waveguide.

8. A device as defined by claim 5 wherein each of said broad walls is arched outwardly and each of said narrow walls is arched inwardly to provide said shape of said cross-section of said waveguide.

9. A device as defined by claim 5 wherein the cross-section area of said waveguide is greater than normal for propagating said predetermined type electromagnetic wave.

10. A device as defined by claim 5 wherein the walls of said waveguide are joined at right angles.

11. A device as defined by claim 5 wherein said means operable to remove wave types having predetermined characteristics includes a series of transverse slots in at least one of said narrow walls.

12. A device as defined by claim 5 further including means operable to prevent rotation of the plane of polarization of waves of at least one wave type propagating in said waveguide.

13. A device as defined by claim 12 wherein said means operable to prevent rotation of the plane of polarization comprises a series of longitudinal slots in at least one of said broad walls.

14. A device for the low-loss propagation of an electromagnetic wave of the $H_{10}$ type comprising: a waveguide formed of opposed broad and narrow walls with rectangular-like cross-section, the width of said waveguide being at least three halves the wavelength of said electromagnetic wave, the cross-section area of said waveguide being greater than normal for propagation of said wave whereby losses are reduced, at least one of said broad walls being arched outwardly whereby the cutoff frequencies of at least two types of waves other than said $H_{10}$ type wave are separated as compared to being substantially the same in a waveguide of substantially exact rectangular cross-section.

15. The device defined by claim 14 wherein adjacent broad and narrow walls are joined at right angles.

16. The device defined by claim 14 further including means for coupling out waves of at least one wave type other than said $H_{10}$ type from said waveguide.

17. The device defined by claim 16 wherein said means comprises at least a series of transverse slots disposed in at least one of said narrow walls of said waveguide.

18. The device defined by claim 14 further including means for preventing rotation of the plane of polarization of waves of at least one wave type propagating in said waveguide.

19. The device defined by claim 18 wherein said means comprises a series of longitudinal slots disposed in at least one of said broad walls of said waveguide.

References Cited by the Examiner
UNITED STATES PATENTS 2,512,468   6/50   Percival _____ 333—98

FOREIGN PATENTS 1,219,805   12/59   France.
671,206   4/52   Great Britain.

OTHER REFERENCES

Montgomery et al.: Principles of Microwave Circuits, 1948, McGraw-Hill (vol. 8 of Radiation Laboratory Series), pp. 42–45 and 58.

Harvey, A. F.: Microwave Engineering, N.Y., Academic Press, 1963 (page 74 relied on).

ELI LIEBERMAN, *Acting Primary Examiner.*

HERMAN KARL SAALBACH, *Examiner.*